UNITED STATES PATENT OFFICE.

JEAN EFFRONT, OF BRUSSELS, BELGIUM.

PROCESS OF PREPARING MALT BY MEANS OF CHLORID OF LIME OR OTHER HYPOCHLORITE SALTS.

No. 884,725.   Specification of Letters Patent.   Patented April 14, 1908.

Application filed February 3, 1906. Serial No. 300,187.

*To all whom it may concern:*

Be it known that I, JEAN EFFRONT, doctor, a subject of the Belgian King, residing at Brussels, 83 Rue des Rentiers, Belgium, have invented a new and useful Improved Process of Preparing Malt by Means of Chlorid of Lime or other Hypochlorite Salts; and I do hereby declare the following to be a full, clear, and exact description of the same.

The use of chlorid of lime in the steeping of corn for preparing malt has been already proposed and attempted but it has met with unfavorable results, partly because the adding of chlorid of lime to the steeping water has an unfavorable action in reference to the extracted substances of the grain, and partly because the formation of diastase has been hindered and otherwise unfavorably influenced. These undesirable results have for their cause the following: 1. Chlorid of lime always contains free alkaline salts, and these act to hinder the diastatic process. 2. In the previous attempts to use chlorid of lime for this purpose, it has only been active during the steeping operation because the chlorin is destroyed by the organic substances always to be found in the steeping water. The chlorid of lime therefore loses its effect, so that it does not act during the second or germinating period of the malting process. 3. Owing to the fact that the quantities of chlorid of lime have not heretofore been determined in accordance with the quantities of liquid used, a very injurious action on the germination was produced.

In view of the foregoing my invention has for its object to provide an improved method of preparing malt by the use of chlorid of lime and other hypochlorite salts in predetermined proportions in order to overcome the objections above noted and exert, especially, a favorable influence on the formation of diastase and the yield of extract.

In carrying my invention into practice, I employ neutral hypochlorite salts.

Having realized that the ordinary hypochlorite salts of commerce contain a great excess of alkali which, when introduced with the hypochlorite into the steeping water so as to be available during germination, is found to delay or hinder the formation of the diastase and also undesirably to affect the salts themselves, I have ascertained that said hypochlorite should be neutralized in order to obtain the most favorable action thereof and cause the nitrogenous substances in the corn to be fully dissolved; in short, the excess of alkali should be removed. For this purpose I propose to use a neutralized acid which is preferably added slowly and while the hypochlorite solution is being agitated, so as not to disengage the chlorin.

In accordance with my method of treatment the corn is first thoroughly cleaned, whereupon it is steeped and the steeping water made to receive a solution of hypochlorite salt neutralized by means of sulfuric or hydrochloric acid. This solution is added in such manner that the steeping water will contain per liter 0.5 to 0.7 grams of available chlorin. During the steeping period, the proportion of chlorin in the steeping water is noted from time to time and fresh quantities of neutral solution of hypochlorite salts are added thereto as required, the object being to maintain the proportion of chlorin at 0.5 to 0.7 grams per liter during the whole steeping process. The same conditions are of course observed during the changing of the water.

The neutral solution of hypochlorite should be prepared at the moment when it is to be used, for it can not be preserved more than 24 hours. For this purpose, 50 kilos of hypochlorite of lime of commerce are mixed with 1000 liters of cold water; this mixture is then allowed to settle and the resulting clear portion is poured off. The clear portion of this mixture is then put into a wooden vessel provided with an agitator; one hundred cubic centimeters of this solution, which is always alkaline to litmus paper, is then neutralized by the addition of very much diluted sulfuric acid; the neutralization is considered perfect when a drop of water will no longer immediately change the litmus paper to blue.

Knowing what quantity of acid is necessary to neutralize 100 cubic centimeters, it is easy to calculate the quantity of acid which should be added to the remaining clear hypochlorite solution in order to neutralize it exactly. This quantity of acid being determined upon, it is added little by little to the solution while stirring it constantly with the agitator. It is this neutralized solution which is added to the water used for the treatment of the grain during its malting. In order to determine the amount of this solution which must be added to the water so that it will contain the desired proportion of available chlorin, that is to say, 0.5 to 0.7 grams per liter for the soaking and 0.2 to 0.3 grams and 0.7 grams per liter for the watering during the germinating process, the chlorin must be tested; this is done according to the method generally known, that is, by arsenious acid.

In the present case, let us suppose that the neutralized solution contains 12 grams of available chlorin per liter—a quantity which we have often had in practice but which may vary according to the quality and freshness of the hypochlorite used.

For soaking, the grain is put into the usual soaking vats containing water to which 41.66 to 58.53 cubic centimeters of the neutral hypochlorite solution per liter have been added (this quantity being that which must be added so that the soaking water may contain 0.5 to 0.7 grams of available chlorin per liter). After soaking six hours, the water, strengthened with the same amount of a neutral solution of hypochlorite, is renewed; after six hours the soaking water is again renewed, always strengthened by the neutral hypochlorite solution; then the grain is left to soak 24 hours. During the two periods of six hours as well as during that of 24 hours, a sample of the soaking water must be taken every 2 or 3 hours and available chlorin must be put to it in order to bring he quality (tenor) up to 0.5 to 0.7 grams per liter. This testing is done by arsenious acid. Let us suppose that at the moment of testing it is seen that there is not more than 0.3 grams of available chlorin per liter in the water; some of the neutral hypochlorite solution should then be added in order again to obtain the 0.5 to 0.7 grams of chlorin per liter. The quantity to be added in this case would be 32.66 grams per liter of water.

According to the usual practice, the steeping operation is terminated when the corn is completely steeped, i. e, when the grain, after being cut into two parts, will no longer show a white, mealy, dry core. In my method, however, I prefer to stop the steeping operation while the corn is still partially dry inside. The steeping operation is stopped after 12 to 24 hours in accordance with the temperature and the degree of hardness of the corn and is completed on the floor or in the steeping trough by sprinkling the neutral hypochlorite solution over the malt. This sprinkling is effected during the whole preparation of the malt—that is to say—in the period of 7 to 8 days during which the malt remains on the malt floor, and at least once per day: the solution thus sprinkled over the malt contains 0.2 to 0.5 grams of available chlorin per liter. The more the germination advances, the more must the solution used contain chlorin.

Having thus fully described my invention, what I claim as new and desire to secure by Letters Patent is:—

1. The process of preparing grain in the preparation of malt which consists in steeping the grain in the presence of a neutralized hypochlorite salt, substantially as described.

2. The process of treating grain in the preparation of malt which consists in steeping the grain in water and adding to the steeping water a neutralized hypochlorite salt substantially as described.

3. The process of treating grain in the preparation of malt which consists in steeping the grain in water and adding to the steeping water from time to time sufficient neutralized hypochlorite salt to maintain the yield of available chlorin at substantially 0.5 to 0.7 grams per liter of the water, substantially as described.

4. The process of treating grain in the preparation of malt which consists in steeping the grain in the presence of a neutralized hypochlorite salt, terminating the steeping step before the grain is completely steeped, and then effecting the germination of the grain in the presence of a neutralized hypochlorite salt, substantially as described.

In testimony whereof, I have signed my name to this specification in the presence of two subscribing witnesses.

JEAN EFFRONT.

Witnesses:
 CHARLES HONOER,
 GREGORY PHELAN.